United States Patent
Eom

(10) Patent No.: US 11,192,583 B2
(45) Date of Patent: Dec. 7, 2021

(54) VEHICLE AND CONTROLLING METHOD THEREOF

(71) Applicants: HYUNDAI MOTOR COMPANY, Seoul (KR); KIA MOTORS CORPORATION, Seoul (KR)

(72) Inventor: Ki Tae Eom, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 470 days.

(21) Appl. No.: 16/206,544

(22) Filed: Nov. 30, 2018

(65) Prior Publication Data
US 2020/0108867 A1 Apr. 9, 2020

(30) Foreign Application Priority Data
Oct. 8, 2018 (KR) .................. 10-2018-0119991

(51) Int. Cl.
*B62D 15/02* (2006.01)
*B60W 30/12* (2020.01)
*B60W 40/09* (2012.01)

(52) U.S. Cl.
CPC ........... *B62D 15/025* (2013.01); *B60W 30/12* (2013.01); *B60W 40/09* (2013.01); *B60W 2420/42* (2013.01); *B60W 2554/00* (2020.02)

(58) Field of Classification Search
CPC ..... B62D 15/025; B60W 30/12; B60W 40/09; B60W 2554/00; B60W 2420/42
See application file for complete search history.

(56) References Cited

U.S. PATENT DOCUMENTS

| | | | |
|---|---|---|---|
| 9,925,872 B1* | 3/2018 | Alasry ................ | B60W 50/12 |
| 10,227,072 B2* | 3/2019 | Kubota ........... | B60W 30/18163 |
| 10,618,460 B1* | 4/2020 | Baek ................... | B60Q 1/143 |
| 2005/0177308 A1* | 8/2005 | Tange ................ | B60T 8/17557 |
| | | | 701/301 |
| 2007/0139176 A1* | 6/2007 | Victor .................. | B60Q 9/008 |
| | | | 340/435 |
| 2008/0047775 A1* | 2/2008 | Yamazaki ............. | B62D 6/008 |
| | | | 180/443 |
| 2012/0320210 A1* | 12/2012 | Imai ..................... | B60W 50/14 |
| | | | 348/148 |

(Continued)

FOREIGN PATENT DOCUMENTS

| | | | |
|---|---|---|---|
| CN | 105059287 A | * | 11/2015 |
| DE | 102012022387 B3 | * | 2/2014 |

(Continued)

*Primary Examiner* — Redhwan K Mawari
(74) *Attorney, Agent, or Firm* — Slater Matsil, LLP

(57) ABSTRACT

A vehicle and a method for controlling vehicle is provided. A vehicle includes a camera which detects an inside lane and acquires an image of an object around the vehicle, a sensor which acquires traveling information of the vehicle, a storage which stores learning data on a steering pattern, and a controller which determines whether a preset learning condition is satisfied based on the inside lane and the object around the vehicle detected by the camera and extracts lane deviation information based on the traveling information acquired by the sensor to update the learning data on the steering pattern when the learning condition is satisfied.

16 Claims, 10 Drawing Sheets

(56) References Cited

U.S. PATENT DOCUMENTS

| | | | | |
|---|---|---|---|---|
| 2015/0183426 A1* | 7/2015 | Oyama | ............. | B60W 50/0098 |
| | | | | 701/1 |
| 2015/0217693 A1* | 8/2015 | Pliefke | ................... | B62D 13/06 |
| | | | | 348/118 |
| 2017/0004365 A1* | 1/2017 | Ono | ........................ | B60K 37/06 |
| 2017/0137033 A1* | 5/2017 | Habu | .................... | B60W 30/12 |
| 2017/0148327 A1* | 5/2017 | Sim | ......................... | G08G 1/167 |
| 2018/0229770 A1* | 8/2018 | Kataoka | ............... | B62D 15/029 |
| 2018/0347778 A1* | 12/2018 | Sung | ........................ | F21S 41/60 |
| 2020/0290621 A1* | 9/2020 | Ji | ........................ | B60W 30/146 |

FOREIGN PATENT DOCUMENTS

| | | |
|---|---|---|
| KR | 10-2014-0016510 A | 2/2014 |
| KR | 10-2014-0025755 A | 3/2014 |
| WO | WO-2015034828 A1 * | 3/2015 |

* cited by examiner

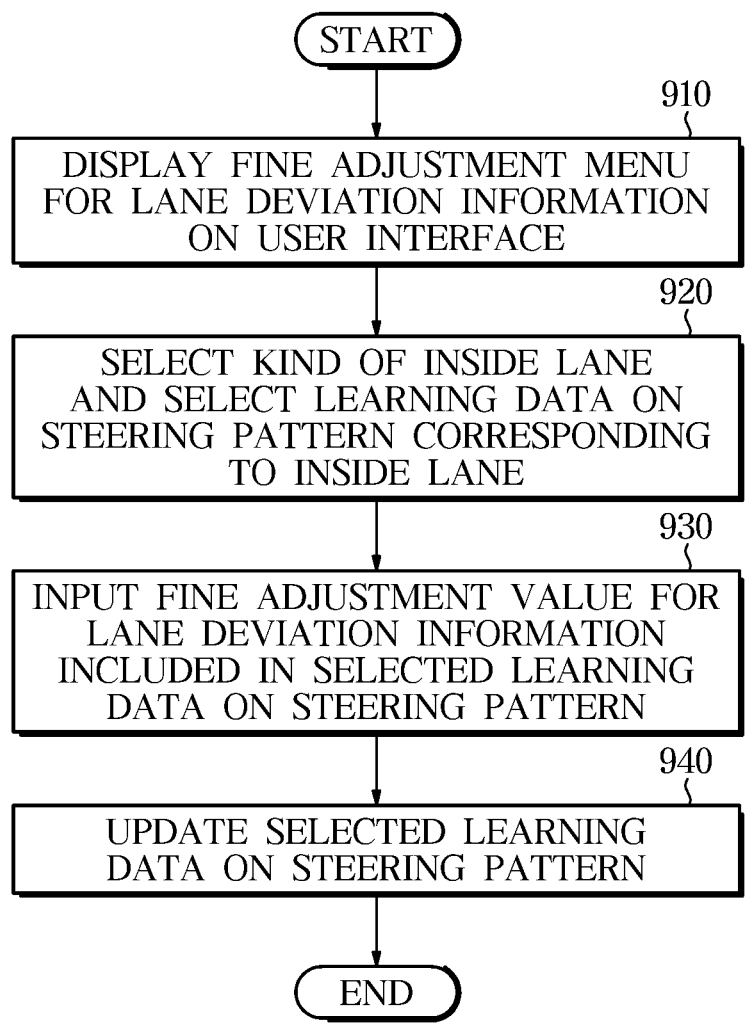

VEHICLE AND CONTROLLING METHOD THEREOF

CROSS-REFERENCE TO RELATED APPLICATION

The present application claims priority to and the benefit of Korean Patent Application No. 10-2018-0119991, filed on Oct. 8, 2018, which is incorporated herein by reference in its entirety.

TECHNICAL FIELD

Forms of the present disclosure relate to a vehicle in which a steering pattern of a driver is reflected under a specific condition when a lane keeping assist system installed in the vehicle is operated, thereby reducing repulsion to automatic steering set such that the vehicle travels along a middle of a lane, and a controlling method thereof.

BACKGROUND

The statements in this section merely provide background information related to the present disclosure and may not constitute prior art.

A lane keeping assist system (lane following assist system) is a system which recognizes a lane on which a vehicle travels and allows the vehicle to maintain the lane even when a driver does not operate a steering wheel. A conventional lane keeping assist system generally allows the vehicle to travel in the middle of the lane.

However, the conventional lane keeping assist system allows the vehicle to uniformly travel along the middle of the lane without taking into consideration a steering pattern of a driver, which differs according to a specific condition or a specific situation. Therefore, the driver may feel discomfort or inconvenience to automatic steering.

SUMMARY

Therefore, it is an aspect of the present disclosure to provide a vehicle in which a steering pattern of a driver is learned according to an inside lane and a specific condition, and a lane keeping assist system is operated according to data on the learned steering pattern, thereby reducing driver's repulsion to automatic steering and improving reliability of the lane keeping assist system, and a controlling method thereof.

Therefore, it is another aspect of the present disclosure to provide a vehicle in which a fine adjuster (paddle shift) or a user interface, which is capable of finely adjusting lane deviation information included in learning data on a steering pattern, is provided so that it is possible for a driver to set a lane keeping assist system such that the lane keeping assist system is operated more suitably for the driver, and a controlling method thereof.

Additional aspects of the disclosure will be set forth in part in the description which follows and, in part, will be obvious from the description, or may be learned by practice of the disclosure.

In accordance with one aspect of the present disclosure, a vehicle includes: a camera which detects an inside lane and acquires an image of an object around the vehicle; a sensor which acquires traveling information of the vehicle; a storage which stores learning data on a steering pattern; and a controller which determines whether a preset learning condition is satisfied based on the inside lane detected by the camera and the object around the vehicle and extracts lane deviation information based on the traveling information acquired by the sensor to update the learning data on the steering pattern when the learning condition is satisfied.

The vehicle may further include a steering device which is controlled by the controller according to the learning data on the steering pattern.

The vehicle may further include a fine adjuster which is provided in a steering wheel and receives a fine adjustment value for the lane deviation information.

The vehicle may further include a user interface which displays the learning data on the steering pattern stored in the storage, displays a setting menu for finely adjusting the lane deviation information included in the learning data on the steering pattern, and receives a fine adjustment value for the lane deviation information from a driver.

When the detected inside lane is a left edge lane of a road and at least one of a median strip, a curved section, and a right adjacent vehicle is detected, the controller may determine that the learning condition is satisfied.

When the detected inside lane is a right edge lane of a road and at least one of a shoulder, a right slope, and a left adjacent vehicle is detected, the controller may determine that the learning condition is satisfied.

When a steering angle change amount sensed by the sensor according to a steering input of a driver is greater than or equal to a preset range, the controller may extract the lane deviation information based on a steering angle change value and may update the learning data on the steering pattern which corresponds to the detected inside lane.

When a steering angle change amount sensed by the sensor according to a steering input of a driver is less than a preset range, the controller may not update the learning data on the steering pattern and may retrieve the learning data on the steering pattern stored in the storage.

When the fine adjuster is operated in a state in which a lane keeping assist system is turned off, the controller may control a transmission to perform a shift function, and when the fine adjuster is operated in a state in which the lane keeping assist system is turned on, the controller may determine that a fine adjustment value for the lane deviation information is input and may update the learning data on the steering pattern based on the lane deviation information which is finely adjusted.

The controller may update the learning data on the steering pattern based on the fine adjustment value for the lane deviation information input through the user interface.

The vehicle may further include a communicator which receives road environment information from the outside, wherein the controller determines whether the learning condition is satisfied by using the road environment information received through the communicator.

In accordance with another aspect of the present disclosure, a controlling method of a vehicle includes: detecting an inside lane and acquiring an image of an object around the vehicle; acquiring traveling information of the vehicle; determining whether a preset learning condition is satisfied based on the inside lane and the object around the vehicle; and extracting lane deviation information based on the acquired traveling information and updating learning data on a steering pattern when the learning condition is satisfied.

The controlling method may further include controlling a steering device provided in the vehicle according to the learning data on the steering pattern.

The controlling method may further include receiving a fine adjustment value for the lane deviation information through a fine adjuster provided in a steering wheel.

The controlling method may further include displaying, by a user interface, the learning data on the steering pattern; displaying, by the user interface, a setting menu for finely adjusting the lane deviation information included in the learning data on the steering pattern; and receiving a fine adjustment value for the lane deviation information from a driver.

In the determining of whether the preset learning condition is satisfied, when the detected inside lane is a left edge lane of a road and at least one of a median strip, a curved section, and a right adjacent vehicle is detected, it may be determined that the learning condition is satisfied.

In the determining of whether the preset learning condition is satisfied, when the detected inside lane is a right edge lane of a road and at least one of a shoulder, a right slope, and a left adjacent vehicle is detected, it may be determined that the learning condition is satisfied.

The updating of the learning data on the steering pattern may include extracting the lane deviation information based on a steering angle change value when a steering angle change amount according to a steering input of a driver is greater than or equal to a preset range.

The updating of the learning data on the steering pattern may include retrieving learning data on a steering pattern stored in a storage without updating the learning data on the steering pattern when a steering angle change amount according to a steering input of a driver is less than a preset range.

When the fine adjuster is operated in a state in which a lane keeping assist system is turned off, a transmission may be controlled to perform a shift function, and when the fine adjuster is operated in which the lane keeping assist system is turned on, it may be determined that a fine adjustment value for the lane deviation information is input and the learning data on the steering pattern may be updated based on the lane deviation information which is finely adjusted.

Further areas of applicability will become apparent from the description provided herein. It should be understood that the description and specific examples are intended for purposes of illustration only and are not intended to limit the scope of the present disclosure.

DRAWINGS

These and/or other aspects of the disclosure will become apparent and more readily appreciated from the following description of the forms, taken in conjunction with the accompanying drawings of which:

FIG. 10 is a flowchart illustrating that lane deviation information is finely adjusted through a user interface.

Figure 1:
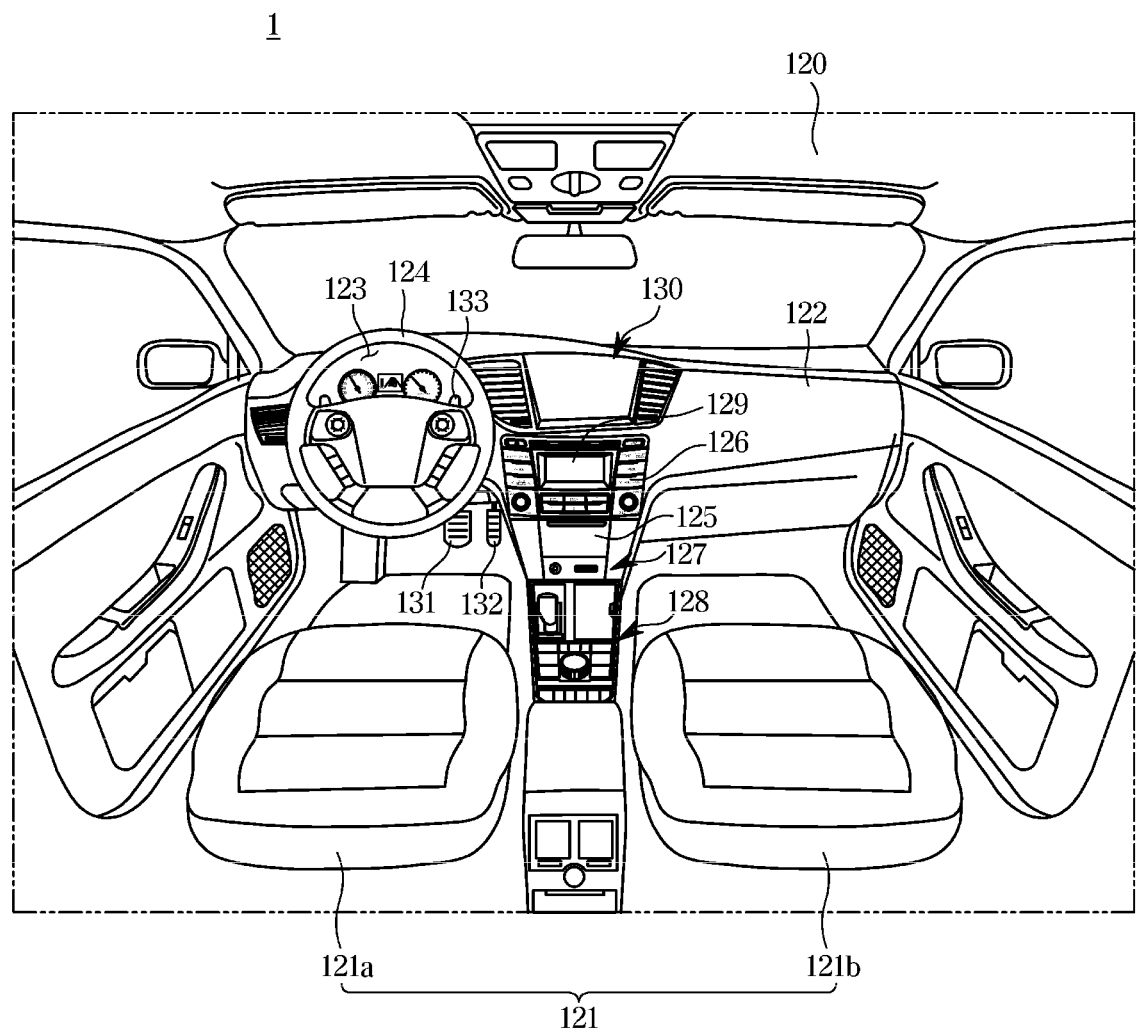
FIG. 1 is a diagram illustrating internal components of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout this specification, when a part is referred to as being "connected" to another part, the two parts may not only be directly connected but may also be indirectly connected, and an indirect connection includes a connection via a wireless communication network.

When a part is referred to as "including" a component, other components are not excluded therefrom and may be further included unless specified otherwise.

The terms "first," "second," etc. are used to distinguish one component from other components, and components are not limited by the terms.

An expression in the singular form includes the plural form unless explicitly stated otherwise.

Identification numbers of respective steps are used for convenience of description, and do not describe a sequence of the respective steps. The respective steps may be carried out in a sequence different from that described unless a particular sequence is specified.

Hereinafter, operating principles and some forms of the disclosure will be described with reference to the accompanying drawings.

FIG. 1 is a diagram illustrating an interior of a vehicle in one form of the present disclosure.

A vehicle body of a vehicle 1 further includes a power generation device, a power transfer device, a traveling device, a steering device 270, a braking device, an accelerator, a suspension device, a transmission, a fuel device, and front, rear, left, and right wheels. In addition, the vehicle 1 further includes various safety devices for safety of a driver and a passenger. As an example of the braking device, a brake pedal 131 may be provided inside the vehicle. As an example of the accelerator, an acceleration pedal 132 may be provided inside the vehicle.

Examples of the safety device of the vehicle 1 include various types of safety devices such as an airbag control device provided to secure safety of the driver and the passenger in the event of a vehicle collision and an electronic stability control (ESC) device provided to stabilize a vehicle attitude during accelerating or cornering of the vehicle.

In addition, the vehicle 1 may include a lane keeping assist system, a lane following assist system, or the like, which senses a lane and generates assist steering torque to control the steering device 270 such that the vehicle 1 does not deviate from an inside lane.

The lane keeping assist system of the vehicle 1 may be operated so as to differently apply lane deviation information according to an inside lane(driving lane) on which the vehicle 1 travels. For example, there may be cases in which the vehicle 1 travels on a left edge lane (first lane), a right edge lane (fourth lane), and a middle lane (second lane or third lane) of a four-lane road. Here, a degree to which the vehicle 1 is deflected to a left lane or a right lane in each of the cases may differ according to a driving pattern or a steering pattern of a driver. This will be described in detail below with reference to FIG. 2.

The vehicle 1 includes an electronic control unit (ECU) configured to control driving of the power generation device, the power transfer device, the traveling device, the steering device 270, the braking device, the suspension device, the transmission, the fuel device, the safety device, and various sensors 220.

On the other hand, the vehicle 1 may include the various sensors 220. For example, the vehicle 1 may further include a proximity sensor configured to sense an obstacle in ahead, behind, or to a side thereof, a rain sensor configured to sense precipitation and a precipitation rate, a velocity sensor configured to detect velocity of a vehicle wheel, a lateral acceleration sensor configured to detect lateral acceleration of the vehicle, a yaw rate sensor configured to detect a change in angular velocity of the vehicle, a gyro sensor, a steering angle sensor configured to detect rotation of a steering wheel and a traveling direction of the vehicle, and the like.

Furthermore, the vehicle 1 may include the camera 210 configured to capture a surrounding image of the vehicle and collect image data.

The camera 210 or the sensor 220 may be mounted in a front radiator grille or front headlamp of the vehicle 1 and may be integrally formed with a heating wire at a rear side of a roof panel, i.e., at an upper side of rear window glass, but a position thereof is not limited.

Referring to FIG. 1, an interior body 120 of the vehicle body includes seats 121 (121a and 121b) on which a passenger sits, a dashboard 122, a gauge board (cluster) 123 disposed on the dashboard 122, a steering wheel 124 configured to control a traveling direction of the vehicle, and a center fascia 125 in which a control panel of an audio device and an air conditioner is disposed, wherein a tachometer, a speedometer, a coolant thermometer, a fuel gauge, a turn indicator, a high beam indicator light, a warning light, a seat belt warning light, an odometer, a traveling recorder, an automatic transmission selector lever indicator, a door open warning light, an engine oil warning light, a fuel shortage warning light, and the like are disposed on the gauge board 123. The seats 21 include a driver's seat 21a on which a driver sits, a front passenger seat 21b on which a fellow passenger sits, and rear seats positioned on a rear side of the vehicle.

In addition, the vehicle 1 may include a paddle shift 133, which is provided in the form of a rod or a switch in the steering wheel 124 to perform a shift function. A gear is shifted according to operation of the paddle shift 133. When a highway drive assist system and the lane keeping assist system of the vehicle 1 is operated, the paddle shift 133 may function as a fine adjuster to finely adjust lane deviation information. The steering wheel 124 and the fine adjuster 280 are defined as being included in the steering device 270.

A fine adjustment of the lane deviation information according to operation of the fine adjuster 280 will be described later.

The cluster 123 may be implemented in a digital manner. The cluster, which is implemented in the digital manner, displays vehicle information and traveling information as images. The cluster 123 may be included in a user interface 260 to be described later.

The center fascia 125 is disposed between the driver seat 121a and the front passenger seat 121b in the dashboard 122 and includes a head unit 126 which controls the audio device, the air conditioner, and heating wires of the seats. Here, the head unit 126 may include a plurality of buttons configured to receive operation commands of the audio device, the air conditioner, and the heating wires of the seats.

In addition, a ventilator, a cigarette lighter, a multi-terminal 127, and the like may be installed in the center fascia 125. Here, the multi-terminal 127 may be disposed adjacent to the head unit 126, may include a USB port and an AUX terminal, and may further include an SD slot.

The vehicle 1 may further include an inputter 128 configured to receive operation commands of various functions and may further include a display 129 configured to display information on a function which is currently executed and information input by a user.

The inputter 128 may be provided in the head unit 126 and the center fascia 125 and may include at least one physical button such as an operation on-off button with various functions and a button for changing setting values of various functions. The inputter 128 may transmit an operation signal of the button to the ECU or an audio-video-navigation (AVN) device 130.

On the other hand, the inputter 128 may include a touch panel integrally provided on a display unit of the AVN device 130. The inputter 128 may be activated and displayed in the form of a button on the display unit of the AVN device 130. In this case, the inputter 128 receives location information of the displayed button. In addition, the AVN device 130 may display vehicle information, traveling information, navigation information, and road environment information as images. The AVN device 130 may be included in the user interface 260 to be described later together with the cluster 123.

The inputter 128 may further include a jog dial (not shown) or a touch pad, which is configured to input a movement command, a selection command, and the like of a cursor displayed on the display unit of the AVN device 130. Here, the jog dial or the touch pad may be provided in the center fascia or the like.

Specifically, the inputter 128 may receive any one of a manual driving mode in which a driver directly drives the vehicle or an autonomous driving mode. When the autonomous driving mode is input, the inputter 128 transmits an input signal of the autonomous driving mode to a controller 240. The lane keeping assist system of the vehicle 1 may be executed in the autonomous driving mode.

The controller 240 may perform a function to distribute signals to devices in the vehicle 1 as well as a function to transfer control signals for the devices in the vehicle 1 to the devices. The controller 240 may mean an ECU. Although it is expressed as the controller 240, the controller 240 is expressed so as to be interpreted in a broad sense, and the present disclosure is not limited thereto.

In addition, the controller 240 includes at least one memory configured to store a program for performing the above-described operations and operations to be described later and at least one processor configured to execute the stored program. The memory and the processor included in the controller 240 may be integrated into one chip or may be physically separated.

Meanwhile, when a navigation function is selected, the inputter 128 receives destination information and transmits the input destination information to the AVN device 130. When a DMB function is selected, the inputter 128 receives channel and volume information and transmits the input channel and volume information to the AVN device 130.

A display panel of the display 129 may be a light-emitting diode (LED) panel, an organic light-emitting diode (OLED) panel, or a liquid crystal display panel.

The AVN device 130 may be provided in the center fascia 125 to receive information from a user and outputs a result corresponding to the input information. The AVN device 130 may perform at least one of a navigation function, a DMB function, an audio function, and a video function and may display environment information of a road and steering information in the autonomous driving mode. The AVN device 130 may be installed in a stationary manner on the dashboard.

Figure 2:
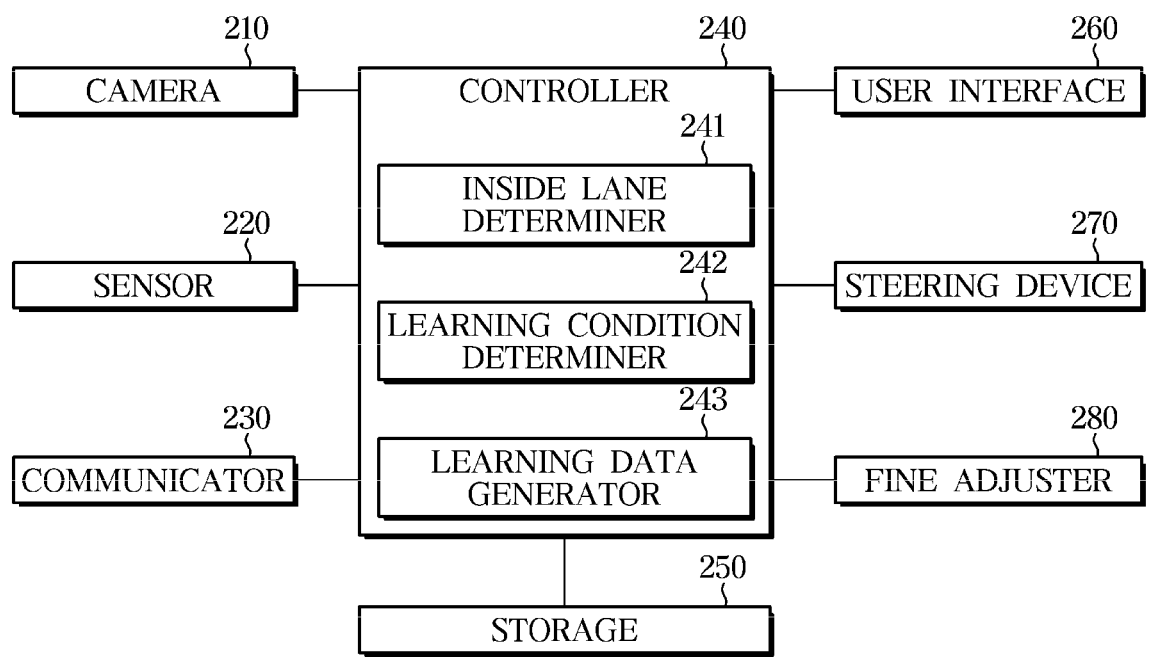
FIG. 2 is a control block diagram of the vehicle in one form of the present disclosure.

FIG. 2 is a control block diagram of the vehicle in one form of the present disclosure.

Referring to FIG. 2, the vehicle 1 may include the camera 210, the sensor 220, a communicator 230, the controller 240, a storage 250, the user interface 260, a steering device 270, and a fine adjuster 280

As described above, the camera 210 may photograph a periphery of the vehicle 1, may detect an inside lane, and may acquire an image of an object around the vehicle, i.e., in ahead, behind, or to a left or right side of the vehicle. The object around the vehicle may include a structure on a road such as a median strip, surrounding vehicles, an obstacle on the inside lane, and the like. In addition, the camera 210 may detect a curved section, a shoulder, and a side slope of a road. The side slope of the road is a concept which includes topography such as a cliff or a precipice, in which a lane is discontinuous.

The sensor 220 may acquire traveling information of the vehicle 1. The travelling information of the vehicle 1 may include velocity, longitudinal acceleration, lateral acceleration, a steering angle change amount, a traveling direction, and the like of the vehicle 1. For example, when a steering input is input from a driver (when the driver operates the steering device 270), the sensor 220 may obtain a steering angle change amount. This travelling information is used to extract lane deviation information.

The lane deviation information includes a degree in which the vehicle 1 is deflected to a left or right lane when the vehicle travels. That is, the lane deviation information means a distance by which the vehicle 1 deviates from the left or right lane or a distance by which the vehicle deviates from a middle of the lane.

The communicator 230 receives road environment information from the outside. The road environment information may include specific information on a road environment in which the vehicle 1 travels. For example, the road environment information may include pieces of information on an obstacle, a median strip section, a curved section, a cliff section, a shoulder, and the like on a travelling road. The road environment information received through the communicator 230 may be displayed on the user interface 260. The road environment information is used when the controller 240 determines whether a learning condition for updating learning data on a steering pattern of a driver is satisfied.

Meanwhile, the communicator 230 may use various communication technologies. The communicator 230 may receive data from the outside using wireless mobile communication technology such as vehicle-to-vehicle (V2V) communication, Wi-Fi, a wireless local area network (WLAN), an ultra-mobile broadband (UMB), a global positioning system (GPS), long term evolution (LTE), or the like.

The controller 240 may determine whether a preset learning condition is satisfied based on an inside lane and an object around the vehicle which are detected by the camera 210. When the learning condition is satisfied, the controller 240 may update learning data on a steering pattern by extracting lane deviation information based on traveling information acquired by the sensor 220.

Specifically, the controller 240 includes an inside lane determiner 241, a learning condition determiner 242, and a learning data generator 243.

The inside lane determiner 241 may determine whether a lane, on which the vehicle 1 currently travels, corresponds to any lane based on the inside lane and the object around the vehicle which are detected by the camera 210. In addition, the inside lane determiner 241 may determine a current inside lane based on road environment information received through the communicator 230.

Figure 3:
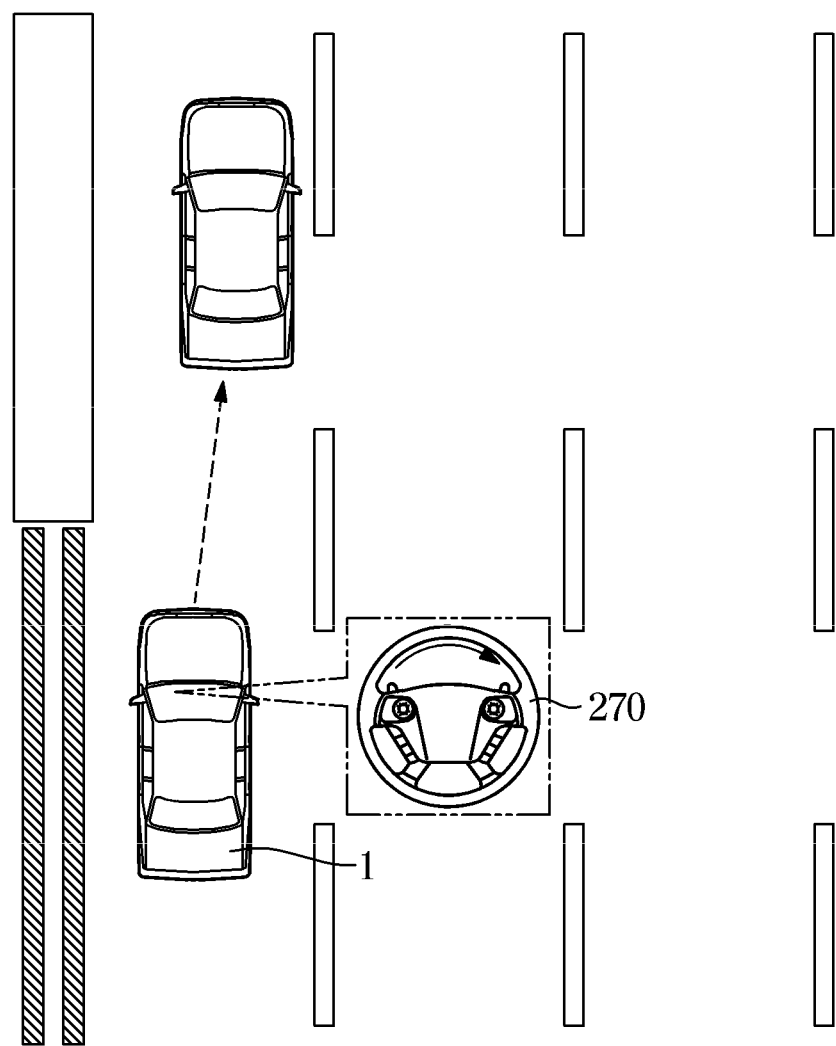
FIG. 3 is a diagram illustrating that the vehicle in one form of the present disclosure updates learning data on a steering pattern under a specific condition.

For example, as illustrated in FIG. 3, when the vehicle 1 travels on a four-lane road, the inside lane determiner 241 may determine whether the vehicle 1 travels on a left edge lane (first lane), a right edge lane (fifth lane), or a middle lane (second lane or a third lane).

The learning condition determiner 242 may determine whether a learning condition for updating learning data on a steering pattern of a driver is satisfied based on the inside lane and the object around the vehicle which are detected by the camera 210.

The learning data on the steering pattern may include lane deviation information which is changed according to a steering operation of the driver under a specific condition. Specifically, as illustrated in FIG. 3, while the vehicle 1 travels on a first lane (inside lane), a section, in which a median strip (object around the vehicle) exists, may appear on a left lane (center line). In this case, the driver may operate the steering device 270 to drive the vehicle 1 so as to be close to the median strip or drive the vehicle 1 so as to move away from the median strip and be closer to a right lane. That is, when a specific condition such as an entry into the median strip section occurs, the lane deviation information may be changed according to the steering operation of the driver. In other words, the learning data on the steering pattern means data in which lane deviation information changes according to a specific condition in a specific lane is accumulated.

In addition, the driver may drive the vehicle 1 so as to be deflected to a left lane or a right lane according to a surrounding vehicle, a width of a right shoulder, and a right cliff. That is, a steering pattern of the driver may be different for each specific condition.

The specific condition may be defined as a learning condition. Since the learning data on the steering pattern is updated using the lane deviation information changed according to the steering operation of the driver under the specific condition, the specific condition becomes a learning condition for updating the learning data on the steering pattern.

The learning condition may be preset. For example, when the vehicle 1 travels on a left edge lane, a case in which at least one of a median strip, a curved section, and a right vehicle is detected may be set as the learning condition. Furthermore, when the vehicle 1 travels on a right edge lane, a case in which at least one of a shoulder, a right slope, and a left vehicle is detected may be set as the learning condition. When the vehicle 1 travels on a middle lane, a case in which a left vehicle or a right vehicle is detected may be set as the learning condition.

That is, the learning condition determiner 242 may determine whether a preset learning condition is satisfied based on an inside lane and an object around the vehicle.

When the learning condition determiner 242 determines that the learning condition is satisfied, the learning data generator 243 may extract lane deviation information based on traveling information acquired by the sensor 220. Here, the traveling information means a steering angle change amount according to a steering input of the driver. When the steering input occurs during traveling, a traveling direction of the vehicle 1 is changed, and thus, lane deviation information may be changed.

The learning data generator 243 generates learning data on a steering pattern reflecting the extracted lane deviation information or updates learning data on a steering pattern, which is stored in the storage 250.

In addition, when a steering angle change amount sensed by the sensor 220 according to a steering input of the driver is greater than or equal to a preset range, the learning data generator 243 may extract lane deviation information based on a steering angle change value and may update learning data on a steering pattern which corresponds to a detected inside lane.

On the contrary, when the steering angle change amount detected by the sensor 220 according to the steering input of the driver is less than the preset range, the learning data generator 243 may not update learning data on a steering pattern and may retrieve the learning data on the steering pattern stored in the storage 250. That is, when the steering angle change amount is less than the preset range, it is determined that the driver does not operate the steering device 270. Accordingly, it may be considered that it is not necessary to update learning data on the steering pattern. In this case, the lane keeping assist system of the vehicle 1 is operated according to the learning data on the steering pattern stored in the storage 250.

The storage 250 may store the learning data on the steering pattern of the driver. The learning data on the steering pattern stored in the storage 250 before a steering pattern of the driver is learned may be set such that the vehicle travels along a middle of a lane as in a conventional lane keeping assist system.

In addition, the storage 250 may store algorithm data for controlling the vehicle 1. The controller 240 may output a control signal for controlling various devices provided in the vehicle 1 according to such a control algorithm.

The storage 250 may be implemented as at least one of a non-volatile memory device such as a cache, a read-only memory (ROM), a programmable ROM (EPROM), an erasable programmable ROM (EPROM), an electrically erasable programmable ROM (EEPROM), or a flash memory, a volatile memory device such as a random access memory (RAM), and a storage medium such as a hard disk drive (HDD) or a CD-ROM. However, the present disclosure is not limited thereto. The storage 250 may be a memory implemented as a separate chip or may be implemented as a single chip together with a processor.

The user interface 260 may display the learning data on the steering pattern stored in the storage 250 and may display a setting menu for finely adjusting lane deviation information included in learning data on a steering pattern.

Figure 4:
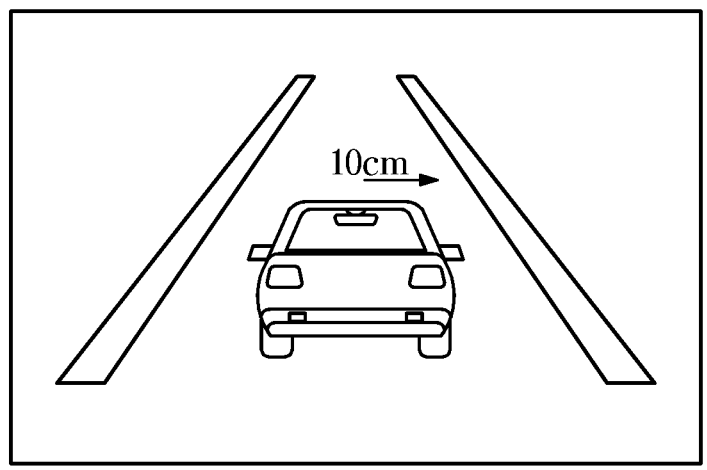
FIGS. 4 and 5 illustrate that learning data on a steering pattern is displayed through a user interface.
Figure 5:
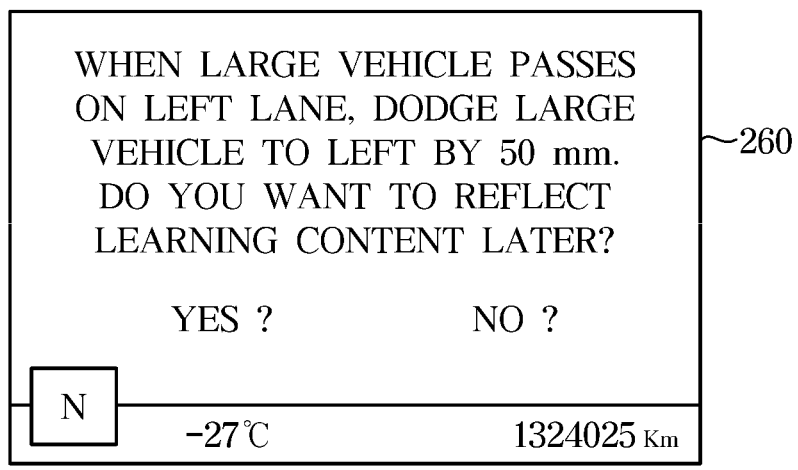
Figure 5:
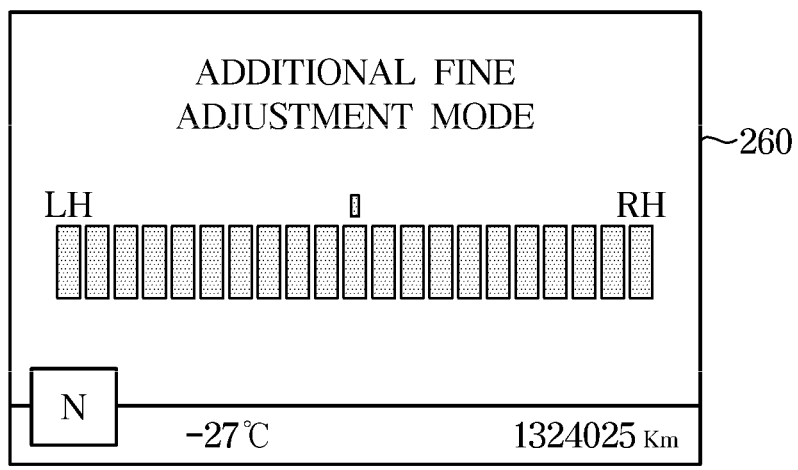

As illustrated in FIG. 4, learning data on a steering pattern may be displayed on a cluster 123 or an AVN device 130 of the vehicle 1. As illustrated in FIG. 5, a screen for adjusting lane deviation information may be displayed. Information displayed on the user interface 260 may include an inside lane, a learning condition, a steering angle change amount, and lane deviation information.

The driver may operate the user interface 260 to input a fine adjustment value for the lane deviation information. That is, the driver may operate the user interface 260 to finely adjust a distance in which the vehicle 1 deviates from a left lane or a right lane. The controller 240 may update learning data on a steering pattern based on a fine adjustment value for the lane deviation information input through the user interface 260.

On the other hand, the fine adjusting of the lane deviation information through the user interface 260 and the updating of the learning data on the steering pattern may be performed even in a state in which the vehicle 1 is not traveling.

The fine adjuster 270 may be provided in the steering wheel 124 and may receive the fine adjustment value for the lane deviation information from the driver. For example, when a right switch of the paddle shift 133, which corresponds to the fine adjuster 270, is operated, the lane deviation information may be adjusted such that the vehicle 1 is moved 10 cm to the right. In addition, when a left switch of the paddle shift 133 is operated, the lane deviation information may be adjusted such that the vehicle 1 is moved 10 cm to the left. That is, the driver may operate the fine adjuster 270 to finely adjust a distance by which the vehicle 1 deviates from a left lane or a right lane. The moving distance for each operation of the fine adjuster 270 may be set freely.

The fine adjustment for the lane deviation information may be performed after the steering wheel 124 is operated or may be performed only by operating the fine adjuster 270 without the operation of the steering wheel 124.

On the other hand, when the fine adjuster 270 is operated in a state in which the lane keeping assist system is turned off, the controller 240 may control the transmission to perform a shift function. When the fine adjuster 270 is operated while the lane keeping assist system is turned on, the controller 240 may determine that a fine adjustment value for lane deviation information is input and may update learning data on a steering pattern based on finely adjusted lane deviation information.

As described above, according to the present disclosure, a steering pattern of a driver according to an inside lane and a specific condition may be learned, and a lane keeping assist system may be operated according to data on the learned steering pattern, thereby reducing driver's repulsion to automatic steering and improving reliability of the lane keeping assist.

In addition, according to the present disclosure, a fine adjuster (paddle shift) or a user interface, which is capable of finely adjusting lane deviation information included in learning data on a steering pattern, may be provided so that it is possible for a driver to set a lane keeping assist system such that the lane keeping assist system is operated more suitably for the driver.

Figure 6:
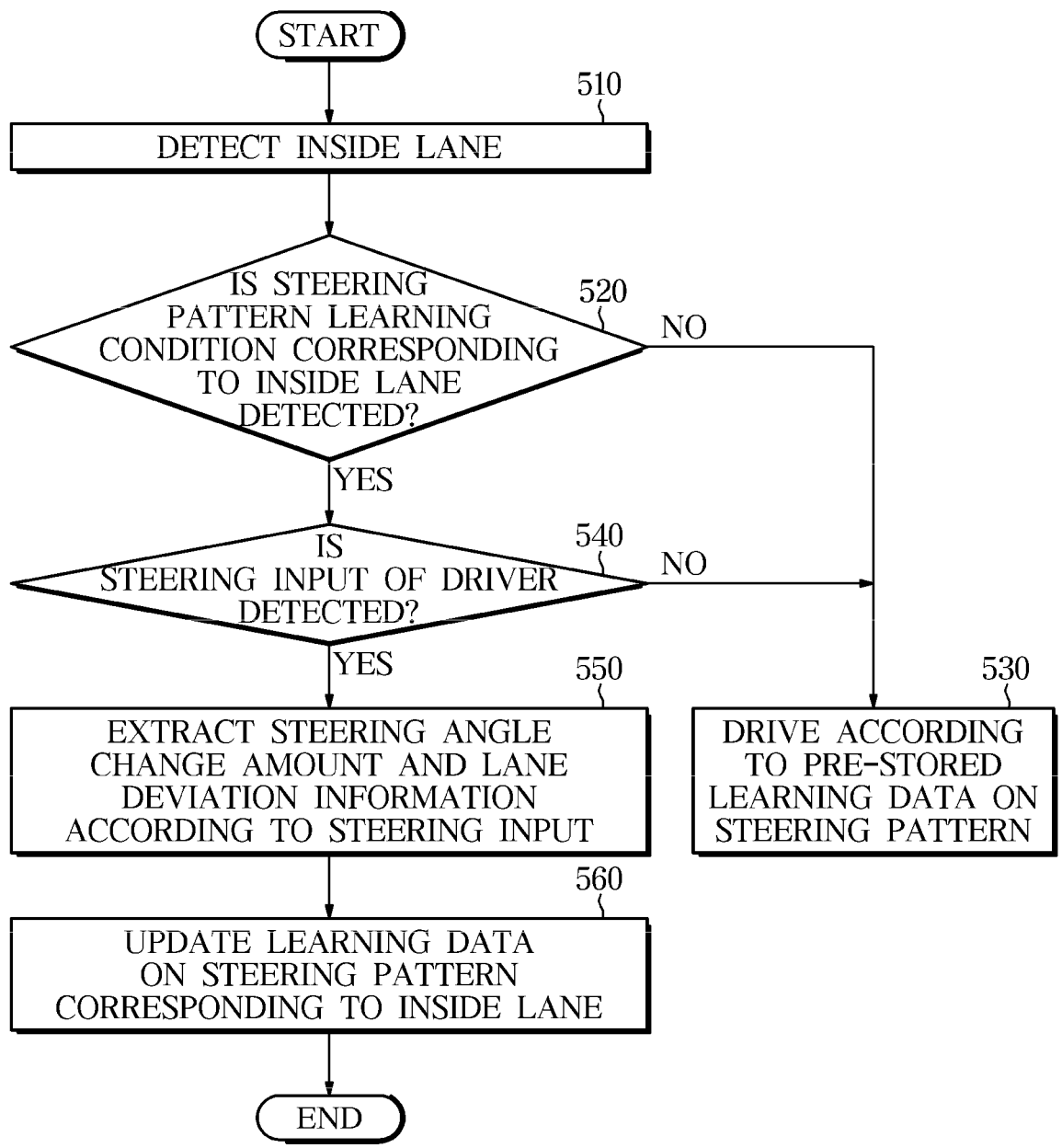
FIG. 6 is a flowchart of a controlling method of a vehicle in one form of the present disclosure.

FIG. 6 is a flowchart of a controlling method of a vehicle in one form of the present disclosure.

Referring to FIG. 6, a controller 240 detects an inside lane based on an image acquired by a camera 210 (510). The controller 240 determines whether a learning condition of a steering pattern is detected based on the inside lane and an object around the vehicle which are detected by a camera 210 (520). When the learning condition is not detected, the controller 240 controls a lane keeping assist system of a vehicle 1 such that the vehicle 1 travels according to learning data on a steering pattern pre-stored in a storage 250.

When the learning condition is detected, the controller 240 determines whether there is an operation of the steering device 270 by the driver (540). When a steering input of the driver is not detected, the controller 240 controls the lane keeping assist system of the vehicle 1 such that the vehicle 1 travels according to the learning data on the steering pattern pre-stored in the storage 250. When the steering input of the driver is detected, the controller 240 extracts steering angle change amount and lane deviation information (550). Thereafter, the controller 240 updates learning data on a steering pattern corresponding to an inside lane (560).

Figure 7:
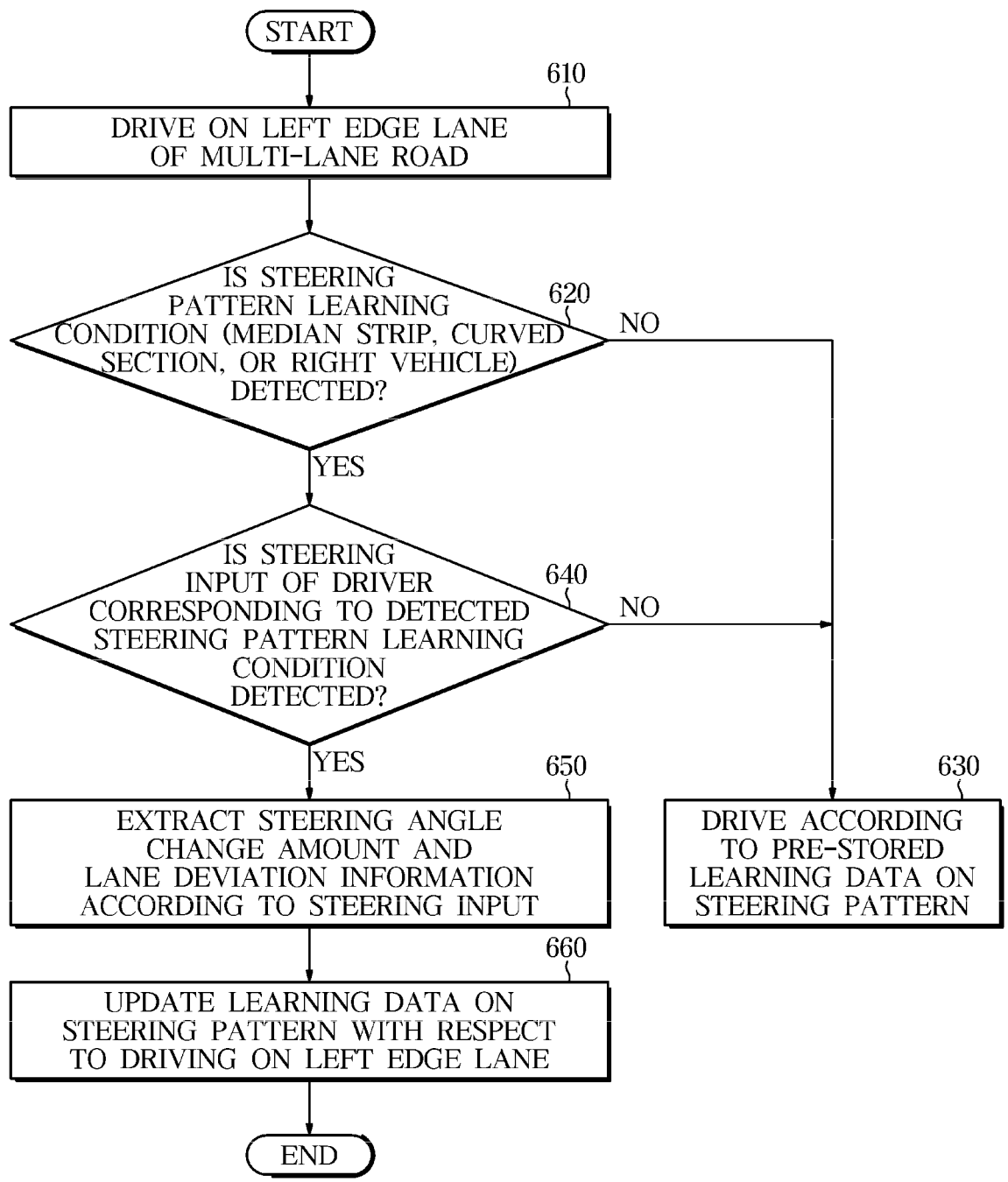
FIGS. 7 and 8 are flowcharts illustrating that learning data on a steering pattern is updated according to an inside lane.
Figure 8:
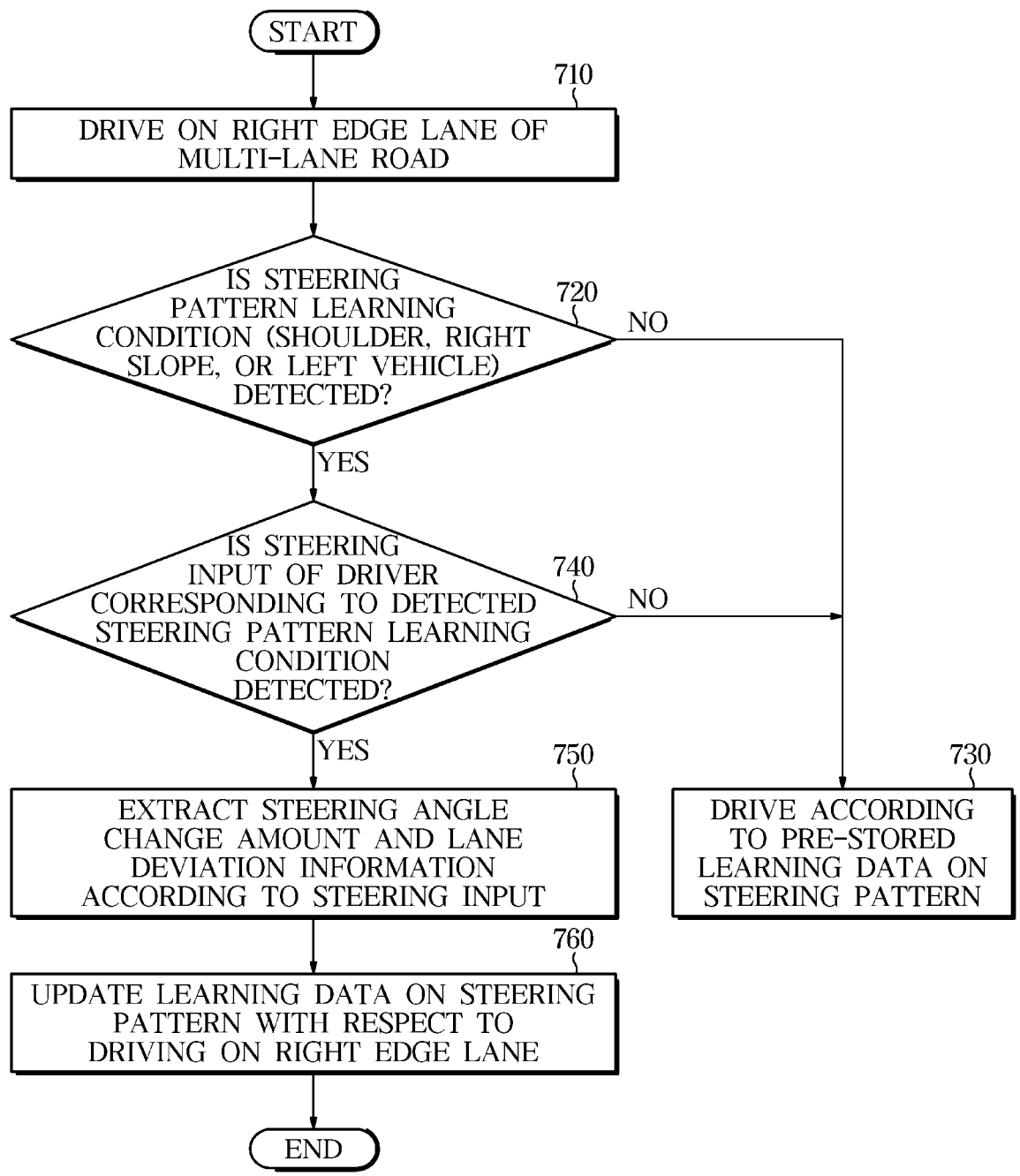

FIGS. 7 and 8 are flowcharts illustrating that learning data on a steering pattern is updated according to an inside lane.

Referring to FIG. 7, a controller 240 determines a lane on which a vehicle 1 travels from an image acquired by a camera 210. That is, when the vehicle 1 travels on a left edge lane (hereinafter, referred to as a first lane) of a multi-lane road, the controller 240 may determine the first lane to be an inside lane based on the image acquired by the camera (610). After that, the controller 240 may determine whether a learning condition corresponding to the first lane is detected (620). Specifically, the controller 240 determines whether at least one of a median strip, a curved section, and a right vehicle is detected. When the learning condition is not detected, the controller 240 controls a lane keeping assist system of the vehicle 1 such that the vehicle 1 travels according to learning data on a steering pattern pre-stored in a storage 250 (630).

When the learning condition is detected, the controller 240 determines whether there is a steering input of a driver which corresponds to the learning condition (640). When the steering input of the driver is not detected, the controller 240 controls the lane keeping assist system of the vehicle 1 such that the vehicle 1 travels according to the learning data on the steering pattern pre-stored in the storage 250 (630). When the steering input of the driver is detected, the controller 240 extracts steering angle change amount and lane deviation information (650). Then, the controller 240 updates learning data on a steering pattern which corresponds to the left edge lane (first lane) (660).

Referring to FIG. 8, a controller 240 determines a lane on which a vehicle 1 travels from an image acquired by a camera 210. That is, when the vehicle 1 travels on a right edge lane of a multi-lane road, the controller 240 may determine the right edge lane to be an inside lane based on the image acquired by the camera 210 (710). After that, the controller 240 determines whether a learning condition corresponding to the right edge lane is detected (720). Specifically, the controller 240 determines whether at least one of a shoulder, a right slope, and a left vehicle is detected. When the learning condition is not detected, the controller 240 controls a lane keeping assist system of the vehicle 1 such that the vehicle 1 travels according to learning data on a steering pattern pre-stored in a storage 250 (730).

When the learning condition is detected, the controller 240 determines whether there is a steering input of a driver which corresponds to the learning condition (740). When the steering input of the driver is not detected, the controller 240 controls the lane keeping assist system of the vehicle 1 such that the vehicle 1 travels according to the learning data on the steering pattern pre-stored in the storage 250 (730). When the steering input of the driver is detected, the controller 240 extracts steering angle change amount and lane deviation information (750). Then, the controller 240 updates learning data on a steering pattern which corresponds to the left edge lane (first lane) (760).

Figure 9:
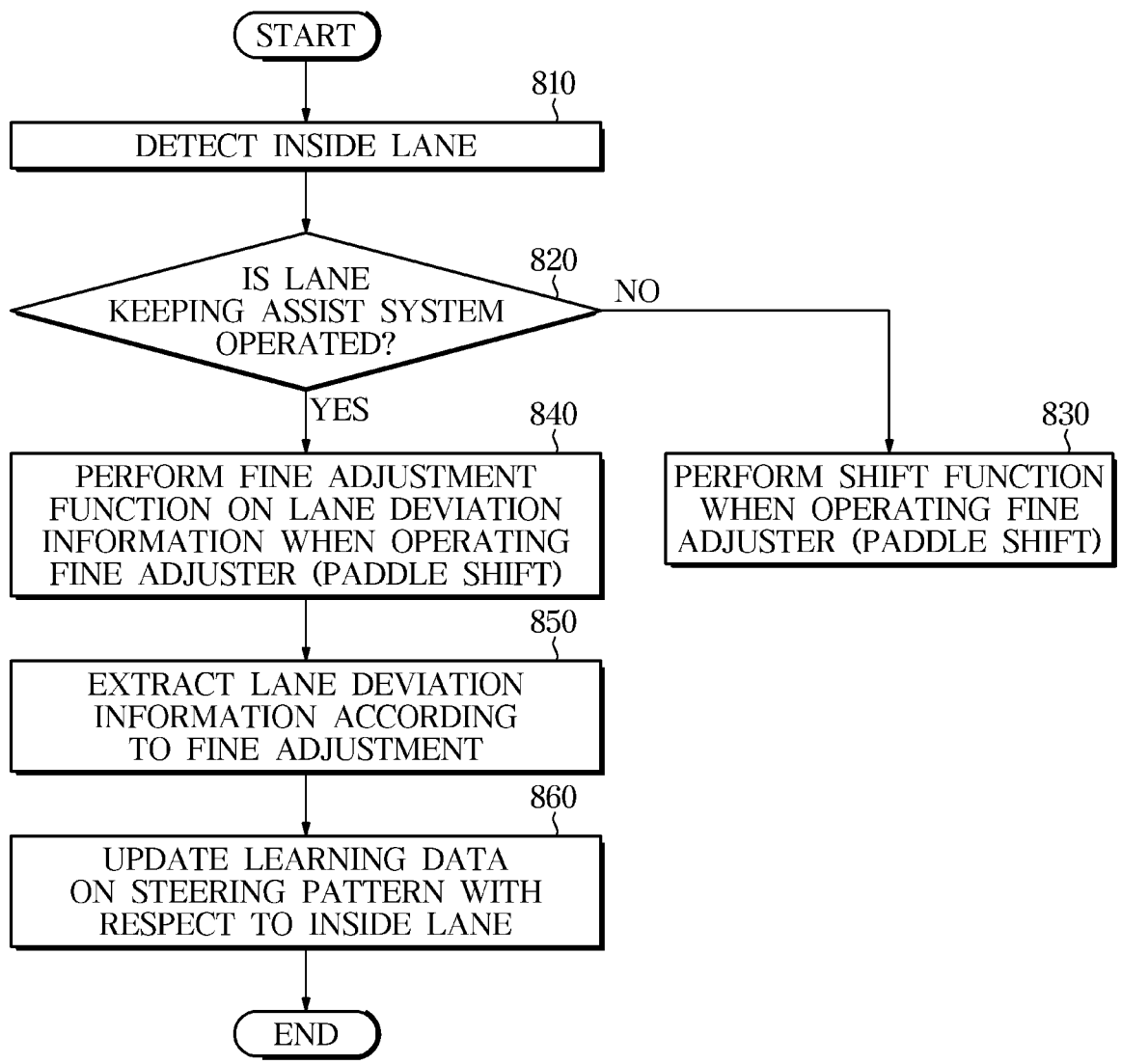
FIG. 9 is a flowchart illustrating that lane deviation information is finely adjusted by a fine adjuster.

FIG. 9 is a flowchart illustrating that lane deviation information is finely adjusted by a fine adjuster.

Referring to FIG. 9, a controller 240 determines a lane on which a vehicle 1 travels from an image acquired by a camera 210 (810). The controller 240 determines whether a lane keeping assist system is operated (820). When a fine adjuster 270 is operated in a state in which the lane keeping assist system is turned off, the controller 240 controls a transmission to perform a shift function (830).

When the fine adjuster 270 is operated in a state in which the lane keeping assist system is turned on, the controller 240 determines that a fine adjustment value is input in lane deviation information and performs a fine adjustment function on the lane deviation information (840). The controller 240 extracts the finely adjusted lane deviation information (850) and updates learning data on a steering pattern which corresponds to an inside lane (860).

FIG. 10 is a flowchart illustrating that lane deviation information is finely adjusted through a user interface.

Referring to FIG. 10, a user interface 260 displays learning data on a steering pattern stored in a storage 250 according to an input of a driver and displays a setting menu for finely adjusting lane deviation information included in the learning data on the steering pattern (910).

The user interface 260 receives selection of a specific inside lane and learning data on a steering pattern corresponding to the specific inside lane from a driver (920).

Then, the user interface 260 receives a fine adjustment value for lane deviation information included in the selected learning data on the steering pattern (930) and updates the selected learning data on the steering pattern based on the adjusted lane deviation information.

As described above, according to the present disclosure, a steering pattern of a driver according to an inside lane and a specific condition may be learned, and a lane keeping assist system may be operated according to data on the learned steering pattern, thereby reducing driver's repulsion to automatic steering and improving reliability of the lane keeping assist.

In addition, according to the present disclosure, a fine adjuster (paddle shift) or a user interface, which is capable of finely adjusting lane deviation information included in learning data on a steering pattern, may be provided so that it is possible for a driver to set a lane keeping assist system such that the lane keeping assist system is operated more suitably for the driver.

Meanwhile, the disclosed forms of the present disclosure can be implemented as recording media storing computer-executable instructions. The instructions can be stored in the form of a program code, and generate, when executed by a processor, a program module such that operation of the disclosed forms of the present disclosure can be performed. The recording media can be implemented as computer-readable recording media.

The computer-readable recording media include all kinds of recording media in which instructions that can be interpreted by a computer are stored. Examples of the computer-readable recording media include a ROM, a RAM, a magnetic tape, a magnetic disc, a flash memory, an optical data storage device, and the like.

As is apparent from the above description, in a vehicle and a controlling method thereof in one form of the present disclosure, a steering pattern of a driver can be learned according to an inside lane and a specific condition, and a lane keeping assist system can be operated according to data on the learned steering pattern, thereby reducing driver's repulsion to automatic steering and improving reliability of the lane keeping assist system.

In addition, according to a vehicle and a controlling method thereof in one form of the present disclosure, a fine adjuster (paddle shift) or a user interface, which is capable of finely adjusting lane deviation information included in learning data on a steering pattern, may be provided so that it is possible for a driver to set a lane keeping assist system such that the lane keeping assist system is operated more suitably for the driver.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
a camera configured to detect an inside lane and acquire an image of an object around the vehicle;
a sensor configured to acquire traveling information of the vehicle;
a fine adjuster provided in a steering wheel;
a storage configured to store learning data on a steering pattern; and
a controller configured to:
determine whether a preset learning condition is satisfied based on the inside lane and the object around the vehicle detected by the camera;
extract lane deviation information based on the traveling information of the vehicle;
update the learning data on the steering pattern when the preset learning condition is satisfied;
when the fine adjuster is operated in a state in which a lane keeping assist system is turned off, control a transmission to perform a shift function; and
when the fine adjuster is operated in a state in which the lane keeping assist system is turned on, determine that a fine adjustment value for the lane deviation information is input and update the learning data on the steering pattern based on the fine-adjusted lane deviation information.

2. The vehicle of claim 1, wherein the vehicle further comprises:
a steering device controlled by the controller based on the learning data on the steering pattern.

3. The vehicle of claim 1, wherein the controller is further configured to:
display the learning data on the steering pattern on a user interface;
display a setting menu for fine-adjusting the lane deviation information on the user interface; and
transmit, to the user interface, the fine adjustment value for the lane deviation information received from a driver.

4. The vehicle of claim 1, wherein, when the inside lane is a left edge lane of a road and at least one of a median strip, a curved section or a right adjacent vehicle is detected, the controller is configured to determine that the preset learning condition is satisfied.

5. The vehicle of claim 1, wherein, when the inside lane is a right edge lane of a road and at least one of a shoulder, a right slope or a left adjacent vehicle is detected, the controller is configured to determine that the preset learning condition is satisfied.

6. The vehicle of claim 1, wherein, when a steering angle variance corresponding to a steering input of a driver is greater than or equal to a preset range, the controller is configured to:
extract the lane deviation information based on the steering angle variance; and
update the learning data on the steering pattern corresponding to the inside lane.

7. The vehicle of claim 6, wherein, when the steering angle variance is less than the preset range, the controller is configured to:
not update the learning data on the steering pattern; and
retrieve the learning data on the steering pattern stored in the storage.

8. The vehicle of claim 3, wherein the controller is configured to update the learning data on the steering pattern based on the fine adjustment value for the lane deviation information that is received by the user interface.

9. The vehicle of claim 1, wherein the vehicle further comprises:
a communicator configured to receive road environment information from outside of the vehicle,
wherein the controller is configured to determine whether the learning condition is satisfied based on the road environment information.

10. A method for controlling a vehicle comprising:
detecting an inside lane and acquiring an image of an object around the vehicle;
acquiring traveling information of the vehicle;
determining whether a preset learning condition is satisfied based on the inside lane and the object around the vehicle;
extracting lane deviation information based on the traveling information of the vehicle;
updating learning data on a steering pattern when the preset learning condition is satisfied;
when a fine adjuster is operated in a state in which a lane keeping assist system is turned off, controlling a transmission to perform a shift function; and
when the fine adjuster is operated in which the lane keeping assist system is turned on, determining that a fine adjustment value for the lane deviation information is input and updating the learning data on the steering pattern based on the fine-adjusted lane deviation information.

11. The method of claim 10, wherein the method further comprises:
controlling a steering device corresponding to the learning data on the steering pattern.

12. The method of claim 10, wherein the method further comprises:
displaying, by a user interface, the learning data on the steering pattern;
displaying, by the user interface, a setting menu for fine-adjusting the lane deviation information; and
receiving the fine adjustment value for the lane deviation information from a driver.

13. The method of claim 10, wherein determining whether the preset learning condition is satisfied comprises:
when the inside lane is a left edge lane of a road and at least one of a median strip, a curved section or a right adjacent vehicle is detected, determining that the preset learning condition is satisfied.

14. The method of claim 10, wherein determining whether the preset learning condition is satisfied comprises:
when the inside lane is a right edge lane of a road and at least one of a shoulder, a right slope or a left adjacent vehicle is detected, determining that the preset learning condition is satisfied.

15. The method of claim 10, wherein updating the learning data on the steering pattern comprises:
when a steering angle variance corresponding to a steering input of a driver is greater than or equal to a preset range, extracting the lane deviation information based on the steering angle variance.

16. The method of claim 15, wherein updating the learning data on the steering pattern comprises:
when the steering angle variance corresponding to the steering input of the driver is less than the preset range, retrieving learning data on a steering pattern stored in a storage without updating the learning data on the steering pattern.

\* \* \* \* \*